Feb. 25, 1964  J. W. MULLEN II, ET AL  3,122,418
METHOD OF MAKING CARBON BLACK
Filed April 8, 1957  6 Sheets-Sheet 2
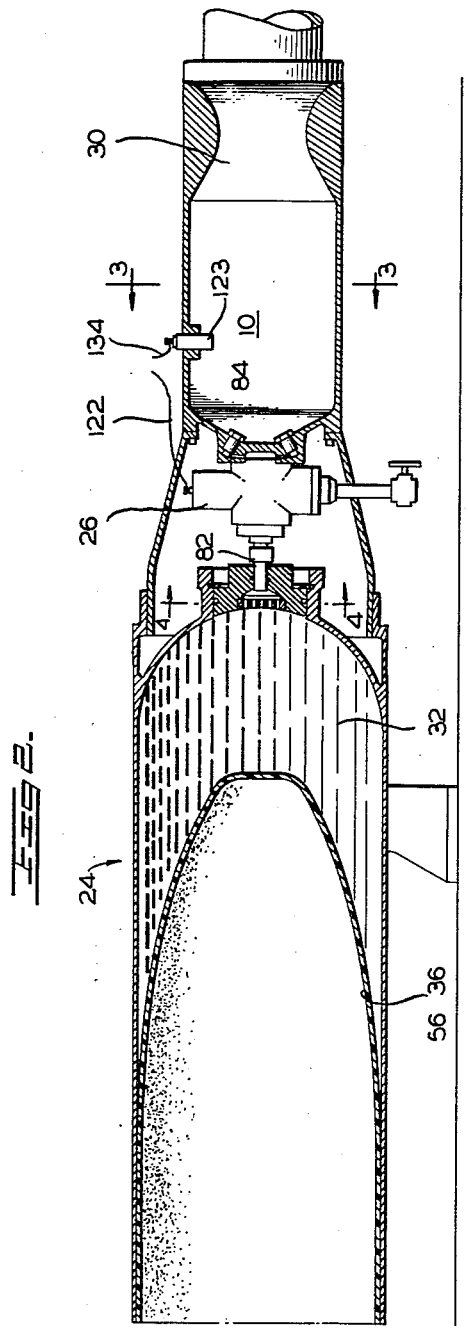
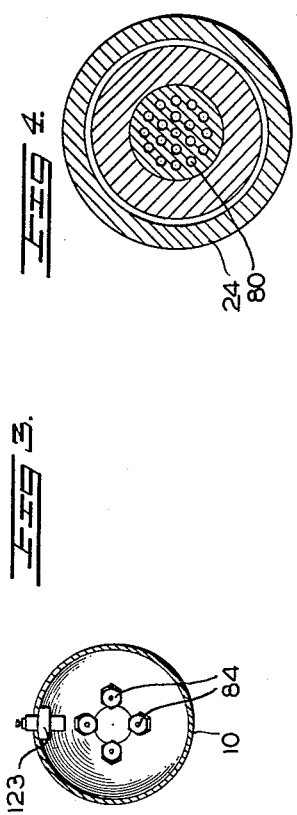
INVENTOR
JAMES W. MULLEN II
JOHN B. FENN
FRANK I. TANCZOS
BY Harold T. Stowell
Harold L. Stowell
ATTORNEY

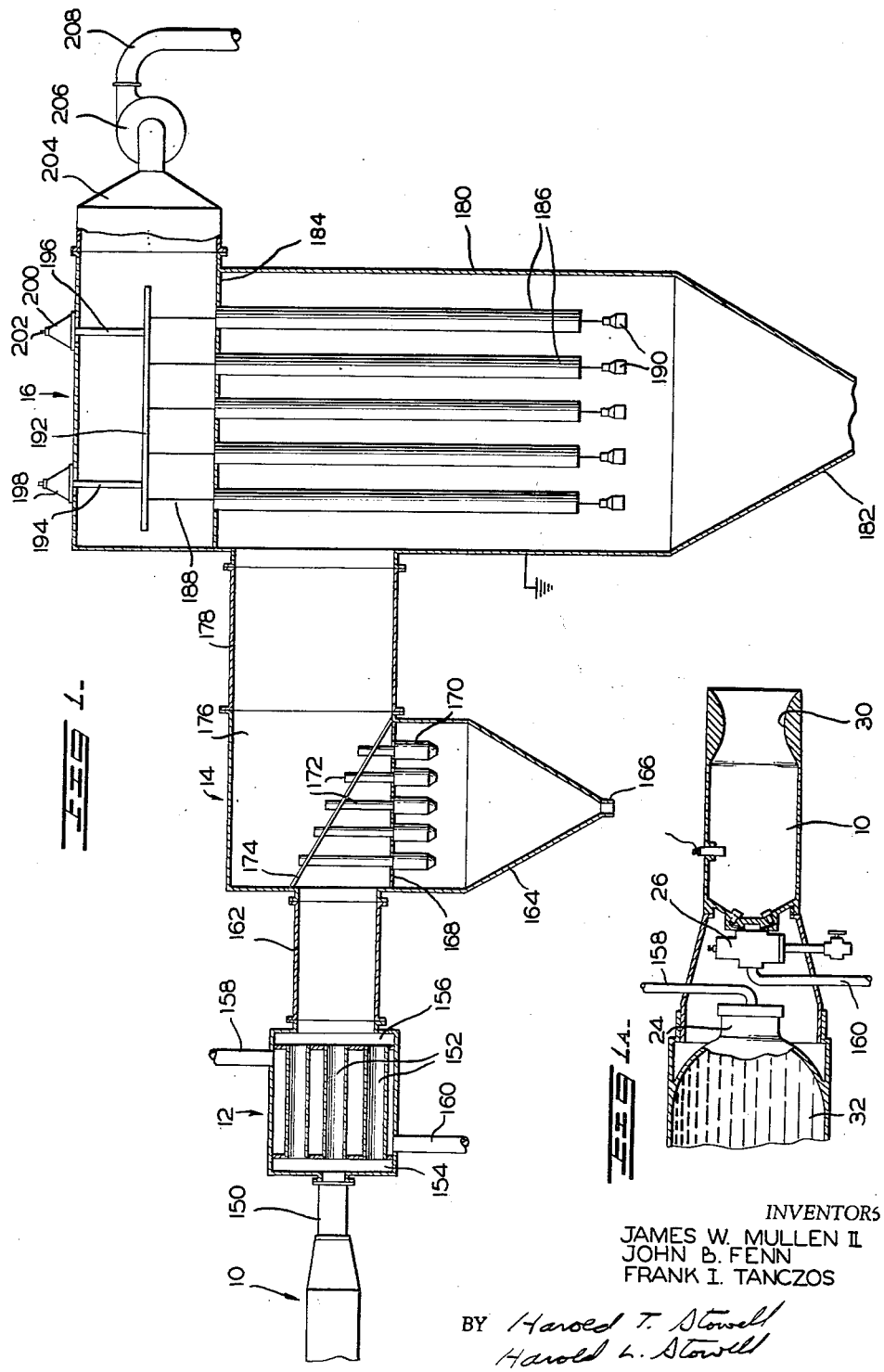

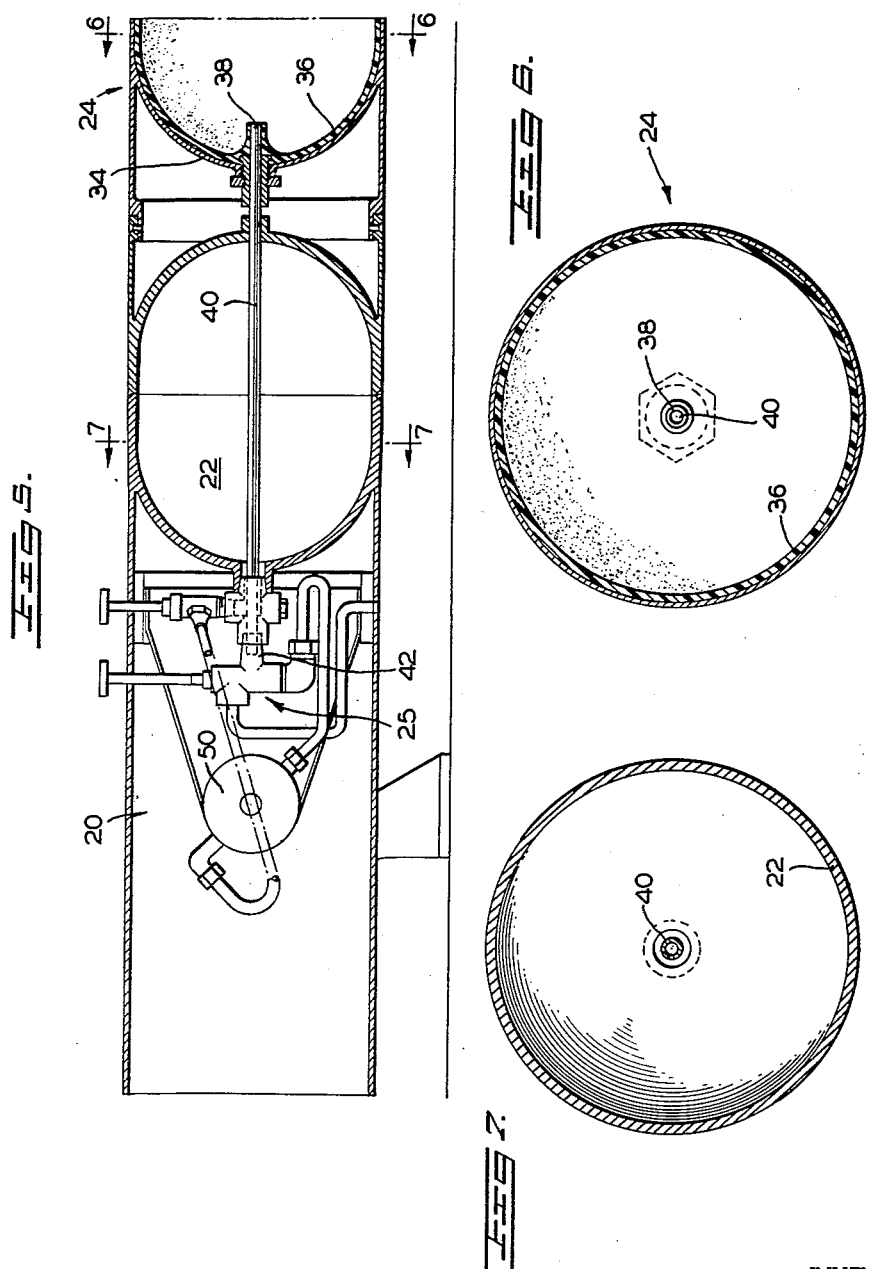

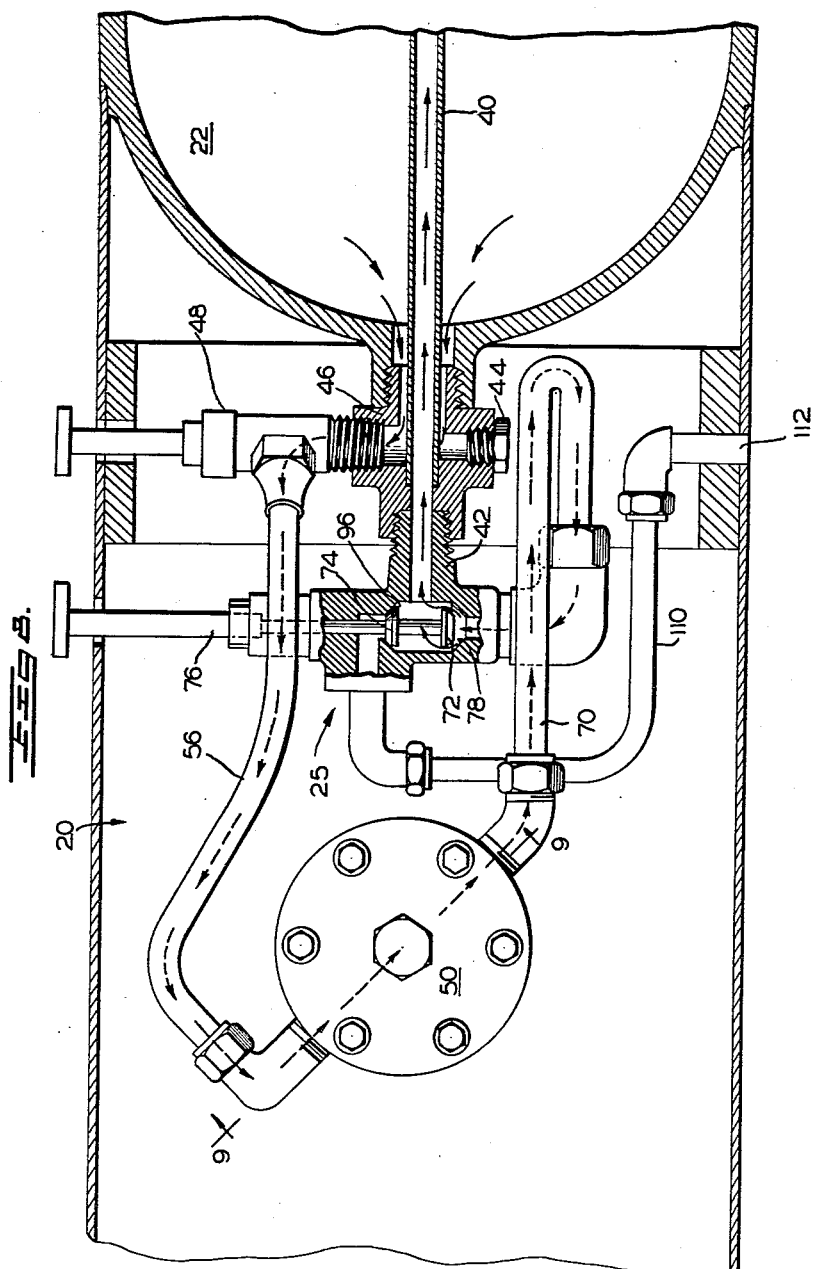

Feb. 25, 1964    J. W. MULLEN II, ET AL    3,122,418
METHOD OF MAKING CARBON BLACK
Filed April 8, 1957                                    6 Sheets-Sheet 5
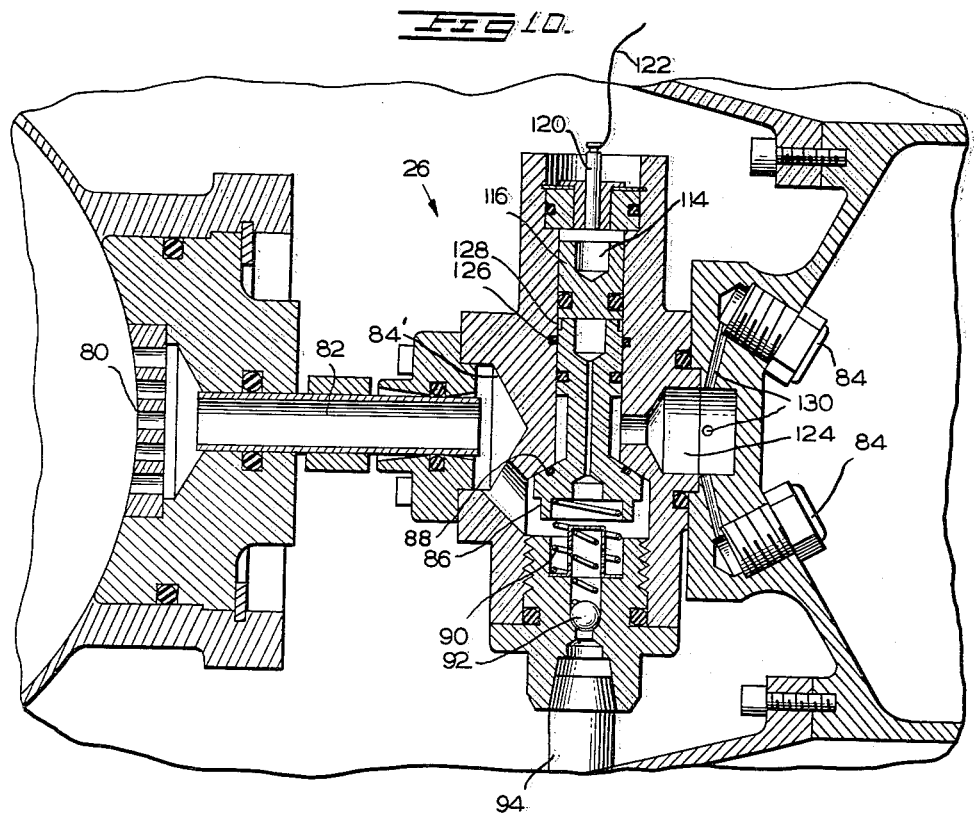
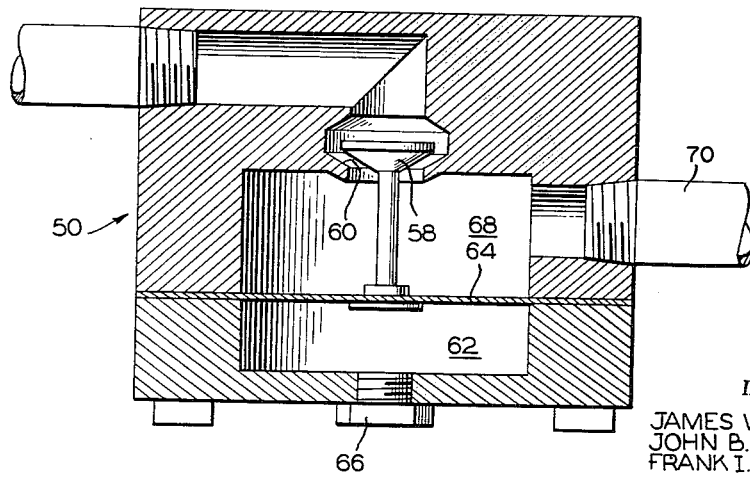
INVENTORS
JAMES W. MULLEN II
JOHN B. FENN
FRANK I. TANCZOS
BY Harold T. Stowell
   Harold L. Stowell
                    ATTORNEY

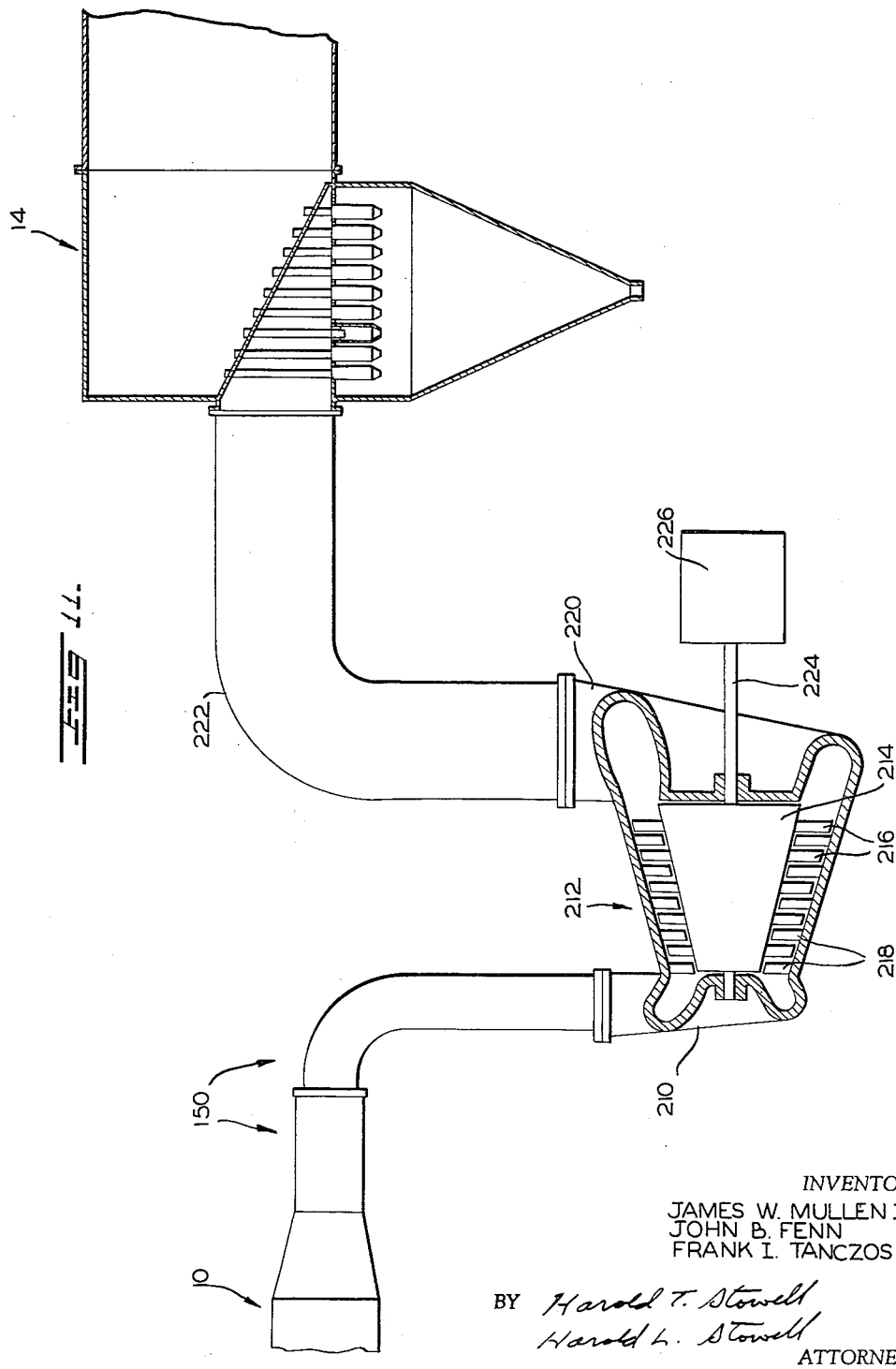

3,122,418
METHOD OF MAKING CARBON BLACK
James W. Mullen II, Richmond, Va., John B. Fenn, Princeton, N.J., and Frank I. Tanczos, Washington, D.C., assignors to Texaco Experiment Incorporated, a corporation of Virginia
Filed Apr. 8, 1957, Ser. No. 651,547
11 Claims. (Cl. 23—209.4)

This invention relates to a process by which a suitable charging stock may be economically converted into carbon black suspended in a gaseous stream of essentially hydrogen.

It is a particular object of this invention to provide a continuous process for producing finely divided "acetylene black" from unsaturated aliphatic hydrocarbons.

Acetylene black is a standard article of commerce which is generally produced at the present time as a filling for dry batteries. However, other important uses have not been fully commercialized due to the high cost of producing acetylene black.

It is a principal object of this invention to provide a process for producing acetylene black that is well suited for continuous, commercial utilization and wherein large quantities of acetylene black can be produced in short periods of time in simple and compact apparatus.

It is a further object of this invention to provide a process whereby acetylene black and hydrogen may be produced for field use.

These and other objects and advantages are provided by the process of the present invention which generally comprises directing a charging stock, comprising an unsaturated aliphatic hydrocarbon subject to exothermic decomposition with the formation of carbon particles and gaseous decomposition products, into a confined zone maintained at conditions of temperature and pressure effective to cause the charging stock to decompose; removing the products of decomposition of the charging stock at least at sonic speeds from said confined zone while continuing to maintain said conditions of temperature and pressure in the confined zone and thereafter separating the carbon particles from the gaseous decomposition products.

In general, the starting materials used in the method of the invention are unsaturated aliphatic hydrocarbons, containing from 2 to 4 carbon atoms, such as lower acetylenes, olefines and diolefines, for example, acetylene, ethylene, propylene, propyne, butadiene and allene and mixtures thereof.

Table I shows the decomposition products and heat liberated per pound of certain charging stocks.

TABLE I

| Charging Stock (gases) | Equilibrium Decomposition Products at Flame Temperature | | | | |
|---|---|---|---|---|---|
| | Moles per Mole of charging stock | | | | B.t.u.'s per pound (at 77° F.) |
| | C | $H_2$ | $CH_4$ | Other | |
| Acetylene | 2.00 | 0.895 | -------- | 0.2H | 3,030 |
| Ethylene | 1.66 | 1.32 | 0.34 | -------- | 1,200 |
| Propylene | 2.09 | 1.19 | 0.905 | -------- | 980 |
| Propyne | 2.96 | 1.92 | 0.04 | -------- | 2,000 |
| Butadiene-1, 3 | 3.55 | 2.10 | 0.45 | -------- | 1,100 |
| Allene | 2.96 | 1.92 | 0.04 | -------- | 2,000 |

The effective utilization of the aforementioned charging stocks by the methods of the present invention will be more particularly described with reference to the accompanying drawings in which:

FIG. 1 is a sectional view through apparatus suitable for carrying out the process of the present invention;

FIG. 1a is an enlarged fragmentary view of a modified form of the device shown in FIG. 1;

FIG. 2 is an enlarged fragmentary view of a decomposition chamber and charging stock storage chamber of the device shown in FIG. 1;

FIG. 3 is a section substantially on line 3—3 of FIG. 2;

FIG. 4 is a section substantially on line 4—4 of FIG. 2;

FIG. 5 is an enlarged sectional view of the fuel feeding and control mechanism of the device shown in FIG. 1;

FIG. 6 is a section substantially on line 6—6 of FIG. 5;

FIG. 7 is a section substantially on line 7—7 of FIG. 5;

FIG. 8 is an enlarged fragmentary view in partial section of the charging stock metering systems shown in FIG. 5;

FIG. 9 is an enlarged sectional view substantially on line 9—9 of FIG. 8;

FIG. 10 is an enlarged sectional view of the fuel flow initiating valve of the structure shown in FIG. 2 of the drawings; and FIG. 11 is an elevational view in partial section of a modified form of the present invention.

Referring to FIG. 1 of the drawings there is shown apparatus for producing carbon black which generally comprises a decomposition chamber 10 for the charging stock, heat exchange apparatus 12, preliminary carbon particle collecting apparatus 14 and secondary carbon particle collecting apparatus 16.

In order to bring about the continuous exothermic decomposition of the charging stocks of the present invention it is necessary to continuously feed under control conditions the charging stock to a decomposition chamber from which the products of decomposition are withdrawn at least at choking conditions. In order to carry out this portion of the process of the present invention apparatus of the type shown in FIGS. 2 through 10 have been found to give particularly satisfactory results. Referring to FIGS. 2 through 10 there is shown the following structures, each of which will be described in detail hereinafter.

Charging stock regulator and control mechanism 20, high pressure gas storage compartment 22, charging stock storage tank 24, flow initiating valve 26, decomposition chamber 10 and nozzled outlet 30.

The charging stock designated 32 is stored in chamber 24, and in order to transfer it in predetermined quantities to decomposition chamber 10 it is necessary to either pressurize the charging stock by means of a suitable gas pressurization system or pump the material into the decomposition chamber. As shown in the drawings, a pressurized gas system is employed for transferring the charging stock from storage tank 24 to the decomposition chamber 10.

The charging stock storage tank 24 is provided about its forward end 34 with a resilient bladder 36. The resilient bladder 36 separates the charging stock 32 from the pressurized gas inlet 38 of conduit 40, the other end of which communicates with outlet port 42 of valve 25.

Forwardly of the charging stock storage chamber 24 is positioned the pressurized gas storage tank 22 which is charged with a gas such as nitrogen through outlet 44 of T-fitting 46. A manual shut-off valve 48 is maintained in the closed position during the filling of the gas storage chamber 22 to prevent the passage of gas to the gas flow regulator 50. In general, suitable operation is provided by preloading the tank 22 with nitrogen at about 3500 pounds per square inch.

When the valve 48 is manually opened, the compressed gas flows through the valve 48 to the conventional pressure regulator 50 through conduit 56.

The pressure regulator 50 may be of the type shown in detail in FIG. 9 wherein a valve of the poppet type 58 is moved relative to its seat 60 by predetermined pressure maintained in chamber 62 acting upon diaphragm 64. An opening closed by plug 66 is provided to preload the pressure chamber 62. The compressed nitrogen flowing from nitrogen storage chamber 22 through conduit 56 into chamber 68 issues therefrom through conduit 70 at about, for example, 1250 pounds per square inch. Conduit 70 is connected to valve 25, hereinbefore described, having two valve poppets 72 and 74 controlled by a manually actuated stem 76. In operation of the device the valve poppet 72 is moved away from its seat 78 so that the gaseous pressurizing medium may flow from outlet 42 and through conduit 40, which passes through the nitrogen storage compartment 22, and into the storage chamber 24 on the bladder side of the charging stock 32 whereby the bladder 36 is urged toward the discharge end of the chamber 24 forcing the charging stock through the plural outlets 80, more clearly shown in FIGS. 2, 4 and 10 and conduit 82 to the flow initiating valve 26, the discharge port of which connects to the plurality of nozzles 84 positioned at the upstream end of the decomposition chamber 10.

Referring to FIG. 10 the flow initiating valve 26 includes an inlet opening for charging stock 84′, and a poppet valve 86 which in the closed position seats about the flange 88 formed in the valve body. Helical spring 90 urges the poppet valve 86 against the seat 88. At the lower end of the valve body is provided a spring urged ball check 92 which permits communication with an opening 94 for use in filling the chamber 24. During the filling of the tank 24 the spring urged ball check 92 moves away from its normal seated position and charging stock flows through the passage 84′, the conduit 82 and into the tank 24 forcing the bladder 36 towards the end 34. Gas or air at the forward end of the bladder 36 is bled therefrom after manual movement of the poppet 74 of valve 25 away from its seat 96 so that the gas or air flowing out of the space ahead of the bladder passes through conduit 110 where it exhausts to atmosphere through outlet 112.

Referring again to flow initiation valve 26, the poppet valve 86 is moved to the unseated position by a powder charge 114 carried in a pocket in movable piston 116, slidably connected to the upper end of the poppet valve 86. An electric igniter or squib 120, for charge 114, is connected to an external electrical source through electrode 122. Upon excitation of the electric igniter 120 the powder charge 114 burns forcing the piston 116 and the poppet valve 86 downwardly so that charging stock pressurized, as hereinbefore described, will flow from the inlet of the valve 84 past the valve seat 88 and into the plenum chamber 124. A spring type snap ring 126 moves into groove 128 when the poppet valve 86 is moved downwardly by the force of the powder charge 114 so that the valve poppet 86 is held in the open position.

Charging stock entering the plenum chamber 124 passes through the plural passages 130 then into the nozzle 84 from which it is sprayed into the decomposition chamber 10.

At the forward end of the decomposition chamber 10 is provided a small pyrotechnic squib or electrically initiated flare 123 which is connected to an external source of electric power through electrode 134. The initiation of the electric flare 132 causes the hot products of the burning flare to issue into the decomposition chamber 10. The hot products of combustion from the flare 132 initiate the decomposition of the novel charging stock of the present invention. Once decomposition is started, the pressure and temperature within the chamber 10 raise to levels at which the decomposition of freshly injected charging stack is self-supporting proceeds smoothly and continuously. The decomposition products from chamber 10 issue through the nozzle 30 positioned at the rearward end thereof. To provide continuous decomposition of the charging stock a critical pressure and temperature is maintained within the chamber 10 by maintaining at least choking conditions at the exhaust end thereof.

The actual shape of the exhaust opening 30 necessary to maintain at least choking conditions in chamber 10 will depend upon the characteristics of the charging stock and rate of decomposition thereof and choking will occur whenever there is a restriction effective to produce a pressure ratio across the restriction of the order of 2 to 1 under the conditions of operation. In the form of the invention shown, the nozzle 30 represents such a physical restriction.

When using propyne as the charging stock the minimum pressure to sustain the decomposition thereof is about 135 pounds per square inch and the adiabatic equilibrium decomposition temperature is about 1382° C. at 300 p.s.i.a. and with propyne, 1 pound of fuel upon decomposition gives 0.9 pound of carbon, 0.1 pound of hydrogen and about 1700 B.t.u. of heat.

The high velocity stream of hydrogen containing suspended carbon particles issuing from the nozzle 30 pass to the power generating and carbon separating apparatus.

The hot products of decomposition of the charging stock containing large quantities of suspended carbon particles in a gas consisting essentially of hydrogen issue from the decomposition chamber 10 through conduit 150 into a conventional double wall heat exchange apparatus generally designated 12 in FIG. 1 of the drawings. The heat exchange apparatus includes a plurality of ducts 152 which communicate with a plenum chamber 154 at the forward end of the heat exchange apparatus and a plenum chamber 156 at the rearward end thereof.

A suitable heat absorbing medium such as a salt mixture, water, liquid metal or liquid charging stock or the like is passed through the zone defined by the walls of the plenum chamber and the conduits 152. The heat absorbing medium enters the apparatus 12 through conduit 158 and leaves through conduit 160. Since the gases leaving the decomposition chamber 10 may be as hot as about 1500° C. it is desirable to reduce the temperature of the products of decomposition to at least about 300° in the heat exchange apparatus 12.

Where ethylene or proplene are employed as the charging stock without being mixed with acetylene, allene, or propyne which release large quantities of heat during decomposition it has been found advisible to preheat the ethylene or propylene so that it enters the decomposition chamber 28 in a gaseous form.

The preheating of ethylene and propylene may be very conveniently carried out in the form of the apparatus shown in FIG. 1a wherein the liquid charging stock issuing from fuel storage tank 24 enters heat exchange apparatus 12 through conduit 158 (FIG. 1) and leaves the apparatus 12 through conduit 160 and enters flow initiation valve 26 in the gaseous form. By utilizing the heat of decomposition to preheat the propylene and ethylene it is only necessary to supply heat from an external source at the beginning of the process.

The cooled products of decomposition leaving the heat exchange apparatus 12 through conduit 162 pass through a conventional mechanical separator 14 shown by way of example as a plurality of centrifugal cyclone type solid particle separating units. The separator 14 includes a hopper 164 provided with a discharge opening 166 through which the finely divided carbon particles may be withdrawn. Between the hopper 164 and the gas stream inlet 162 is positioned a lower header sheet 168. The header sheet 168 is provided with a plurality of openings into each of which is secured a separator tube 170. Concentrically positioned within each separator tube is an outlet tube 172 the upper end of which passes through an upper header sheet 174 whereby the gases free from a substantial portion of the solid carbon particles issue into an upper plenum chamber, generally designated 176. The gases which may consist primarily of hydrogen with small portions of suspended carbon particles pass from the plenum chamber 176 through conduit 178 to a conventional electrostatic precipitator 16 shown by way of example as a tubular collecting electrode type.

The electrostatic precipitator 16 includes a shell or housing 180 provided with a hopper bottom 182 at its lower end and a header sheet 184 adjacent the upper end. The header sheet 184 is provided with a plurality of openings from each of which depends a conductive tubular collecting electrode 186. Suspended concentrically within each of the collecting tube electrodes 186 is a fine wire discharge electrode 188 provided at the lower end with a conventional tensioning weight 190.

The upper ends of the discharge electrodes 188 are connected to a high tension bus bar 192 supported from the top of the casing 180 by support rods 194 and 196, each of which is secured to an insulator bushing 198 and 200 respectively. As is well known in the art the insulator 200 is provided with an electrical conductor 202 for directing high tension precipitating voltage to the discharge electrodes 188.

The gases issuing from the conduit 178 pass upwardly through the plural tubular type collecting electrodes 186 where the remaining portion of the suspended carbon particles are precipitated upon the inner surfaces of the collecting electrodes. The carbon free gas issues from the upper ends of the tubular collecting electrodes to outlet 204 where the gas may be passed through a suitable compressor or blower 206 having a discharge outlet conduit 208. The gaseous products of decomposition passing through the conduit 208 may be used as fuel for generating heat or separately collected as is well known in the art. The electrostatic precipitator may also include conventional rapping means for removing the collected carbon particles from the tubular electrodes 186.

While only one form of collecting apparatus has been shown by way of example it is contemplated that mechanical-electrostatic or mechanical apparatus alone may be used for separating the solid suspended carbon particles from the gases derived in the decomposition of the charging stock and collecting apparatus such as shown in, for example, United States Patent 2,677,439, C. W. J. Hedberg, would provide very satisfactory means for collecting the carbon particles.

Referring to FIG. 11 a modified form of the apparatus for removing the heat from the decomposed charging stock and separating the suspended carbon particles from the gaseous decomposition products is shown. In this form of the invention the hot products of decomposition issuing from decomposition chamber 10 pass through conduit 150 to an inlet leader 210 of a plural stage gas turbine generally designated 212. The gas turbine includes a rotor 214 provided with a plurality of turbine blades 216 which turbine blades are associated with fixed turning vanes 218. The products of decomposition issue from the turbine 212 through outlet header 220 and then pass through conduit 222 to, for example, a cyclone type gas cleaning device 14 of the type shown and described with reference to FIG. 1 of the drawings.

The rotor 214 of the turbine 212 may be connected by output shaft 224 to, for example, an electric generator 226.

*Example*

One hundred pounds of liquid propyne $CH_3-C \equiv CH$ is placed in tank 24 and the pressurized gas storage tank is filled with nitrogen at 3500 pounds per square inch. The valve 46 is opened and the gas flow regulator 50 is set to deliver nitrogen into the tank 24 at about 1200 pounds per square inch. The nozzles 84 are set to deliver a total of 3.6 pounds per second of propyne into decomposition chamber 10 having a diameter of 12 inches and an outlet diameter of 1.4 inches.

The flow initiation valve 26 and the flare 123 are electrically actuated and the process continues automatically until the liquid propyne in tank 24 is exhausted (about 27 seconds), producing about 90 pounds of acetylene black; about 10 pounds of hydrogen and releasing about 170,000 B.t.u.'s of heat.

Under these conditions the decomposition products leave the outlet of the decomposition chamber at about 2500° F. and it has been found that by using a single stage turbine constructed of molybdenum-titanium alloy operating at a speed of about 27,000 r.p.m. about 1300 H.P. can be developed.

From the foregoing description of the present invention and the means for carrying out the invention it will be seen that revolutionary new processes for producing carbon black and particularly acetylene black have been provided satisfying the the aims, objects and advantages of the present invention.

This application is a continuation-in-part of our application Serial No. 239,952, filed August 2, 1951, now abandoned.

We claim:

1. A method of making carbon black comprising directing a charging stock, comprising an unsaturated aliphatic hydrocarbon containing from 2 to 4 carbon atoms subject to exothermic decomposition with the formation of carbon particles and gaseous decomposition products, into a confined zone maintained at conditions of temperature and pressure effective to cause the charging stock to decompose; removing the products of decomposition of the charging stock at least at sonic speeds from said confined zone while continuing to maintain said conditions of temperature and pressure in the confined zone and thereafter separating the carbon particles from the gaseous decomposition products.

2. A method of making carbon black comprising directing a charging stock, comprising an acetylenic hydrocarbon containing from 2 to 4 carbon atoms subject to exothermic decomposition with the formation of carbon particles and gaseous decomposition products, into a confined zone maintained at conditions of temperature and pressure effective to cause the charging stock to decompose; removing the products of decomposition of the charging stock at least at sonic speeds from said confined zone while continuing to maintain said conditions of temperature and pressure in the confined zone and thereafter separating the carbon particles from the gaseous decomposition products.

3. A method of making carbon black comprising directing a charging stock, comprising an olefinic hydrocarbon containing from 2 to 4 atoms subject to exothermic decomposition with the formation of carbon particles and gaseous decomposition products, into a confined zone maintained at conditions of temperature and pressure effective to cause the charging stock to decompose; removing the products of decomposition of the charging stock at least at sonic speeds from said confined zone while continuing to maintain said conditions of temperature and pressure in the confined zone and thereafter separating the carbon particles from the gaseous decomposition products.

4. A method of making carbon black comprising directing a charging stock, comprising a diolefinic hydrocarbon containing from 2 to 4 carbon atoms subject to exothermic decomposition with the formation of carbon particles and gaseous decomposition products, into a confined zone maintained at conditions of temperature and pressure effective to cause the charging stock to decompose; removing the products of decomposition of the charging stock at least at sonic speeds from said confined zone while continuing to maintain said conditions of temperature and pressure in the confined zone and thereafter separating the carbon particles from the gaseous decomposition products.

5. The invention defined in claim 2 wherein the acetylenic hydrocarbon comprises propyne.

6. The invention defined in claim 3 wherein the olefinic hydrocarbon comprises ethylene.

7. The invention defined in claim 3 wherein the olefinic hydrocarbon comprises propylene.

8. The invention defined in claim 4 wherein the diolefinic hydrocarbon comprises butadiene.

9. A method making carbon black comprising directing a charging stock, comprising an unsaturated aliphatic hydrocarbon containing from 2 to 4 carbon atoms subject to exothermic decomposition with the formation of carbon particles and gaseous decomposition products, in the liquid state, into a confined zone maintained at conditions of temperature and pressure effective to cause the charging stock to decompose; removing the products of decomposition of the charging stock at least at sonic speeds from said confined zone while continuing to maintain said conditions of temperature and pressure in the confined zone and thereafter separating the carbon particles from the gaseous decomposition products.

10. The method defined in claim 9 wherein the unsaturated hydrocarbon comprises an acetylenic hydrocarbon.

11. The method defined in claim 9 wherein the unsaturated hydrocarbon comprises propyne.

References Cited in the file of this patent
UNITED STATES PATENTS

| | | |
|---|---|---|
| 1,804,249 | Day | May 5, 1931 |
| 2,121,463 | Wisdom | June 21, 1938 |
| 2,368,827 | Hanson et al. | Feb. 6, 1945 |
| 2,417,606 | Mitchell et al. | Mar. 18, 1947 |
| 2,453,440 | Kaufmann et al. | Nov. 9, 1948 |
| 2,625,466 | Williams et al. | Jan. 13, 1953 |
| 2,648,317 | Mikulasek | Aug. 11, 1953 |
| 2,702,984 | Britton | Mar. 1, 1955 |
| 2,727,932 | Evans et al. | Dec. 20, 1955 |
| 2,769,692 | Heller | Nov. 6, 1956 |

OTHER REFERENCES

"Journal of the American Rocket Society," No. 72, pages 2, 3, 14, 26–28, December 1947.

Lessing: "Scientific American," vol. 188, No. 5, pp. 29–35, May 1953.